(12) United States Patent
Zhu et al.

(10) Patent No.: US 8,380,784 B2
(45) Date of Patent: Feb. 19, 2013

(54) CORRELATED INFORMATION RECOMMENDATION

(75) Inventors: Baojin Zhu, Hangzhou (CN); Qing Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 47 days.

(21) Appl. No.: 12/663,243

(22) PCT Filed: Jul. 20, 2009

(86) PCT No.: PCT/US2009/051152
§ 371 (c)(1),
(2), (4) Date: Dec. 4, 2009

(87) PCT Pub. No.: WO2010/011603
PCT Pub. Date: Jan. 28, 2010

(65) Prior Publication Data
US 2011/0238730 A1    Sep. 29, 2011

(30) Foreign Application Priority Data
Jul. 24, 2008    (CN) .......................... 2008 1 01299547

(51) Int. Cl.
*G06F 15/16* (2006.01)
(52) U.S. Cl. ....................................... 709/203; 709/201
(58) Field of Classification Search .................. 709/203, 709/201
See application file for complete search history.

(56) References Cited

U.S. PATENT DOCUMENTS

| | | | |
|---|---|---|---|
| 6,041,311 A | 3/2000 | Chislenko et al. | |
| 6,092,049 A | 7/2000 | Chislenko et al. | |
| 6,112,186 A | 8/2000 | Bergh et al. | |
| 7,092,936 B1 | 8/2006 | Alonso et al. | |
| 7,231,419 B1 | 6/2007 | Gheorghe et al. | |
| 2001/0021914 A1* | 9/2001 | Jacobi et al. | 705/8 |
| 2003/0149612 A1* | 8/2003 | Berghofer et al. | 705/10 |
| 2007/0078832 A1 | 4/2007 | Ott et al. | |
| 2008/0147619 A1 | 6/2008 | O'Malley | |
| 2008/0162554 A1 | 7/2008 | Martino et al. | |
| 2008/0228552 A1 | 9/2008 | Westphal | |
| 2009/0006442 A1 | 1/2009 | Anderson et al. | |
| 2009/0164516 A1 | 6/2009 | Svendsen et al. | |
| 2009/0182642 A1 | 7/2009 | Sundaresan | |
| 2009/0271246 A1 | 10/2009 | Alvarez et al. | |

FOREIGN PATENT DOCUMENTS
WO    WO2008062964    5/2008

OTHER PUBLICATIONS

The Extended European Search Report mailed Jul. 12, 2011 for European patent application No. 09800848.5, 9 pgs.

* cited by examiner

*Primary Examiner* — Wing F Chan
*Assistant Examiner* — Andrew Woo
(74) *Attorney, Agent, or Firm* — Lee & Hayes, PLLC (57) ABSTRACT

Method and apparatus for information recommendation are provided. In one aspect, a method for information recommendation uses correlated information combinations to improve recommendation accuracy. Upon receiving data from a client indicating a visited information type, the method obtains correlated information types related to the visited information type from stored records. The correlated information types providing one or more correlated information combinations each including at least two correlated information types. For each of the one or more correlated information combinations, the method computes a degree of correlation between the correlated information combination and the visited information type. The method selects a target correlated information combination with a satisfying degree of correlation, and recommends the target correlated information combination to the client.

16 Claims, 3 Drawing Sheets

CORRELATED INFORMATION RECOMMENDATION

RELATED APPLICATIONS

This application is a national stage application of international patent application PCT/US09/51152 filed Jul. 20, 2009, entitled "CORRELATED INFORMATION RECOMMENDATION", which claims priority from Chinese patent application, Application No. 200810129954.7, filed Jul. 24, 2008, entitled "METHOD AND APPARATUS FOR INFORMATION RECOMMENDATION", which applications are hereby incorporated in their entirety by reference.

TECHNICAL FIELD

The present disclosure relates to fields of networking technologies, and particularly to methods and apparatuses for information recommendation.

BACKGROUND

Along with the widespread use of the Internet, information resources on the Internet have been expanding exponentially, causing problems of "information overload" and "information disorientation". A user may often be lost in a space of tremendous information, and cannot smoothly find required information. Therefore, Internet-oriented technologies such as information search, information filtering and collaborative filtering have emerged. One example is e-commerce recommendation systems. These e-commerce recommendation systems directly interact with a user, simulate a salesperson of a shop to provide merchandise recommendation to the user, and help the user to find needed merchandise and complete the purchase process. The existing recommendation systems are developed using real-life examples, e.g., product recommendation through another product, information recommendation through other information, and group recommendation through another group. These recommendation systems, however, do not have wide enough coverage, or high enough accuracy. Under an ever-intensifying competition environment, existing recommendation systems may incur a loss of customers because of these problems, negatively impacting sales volume and browsing volume of a website.

SUMMARY

The present disclosure provides a method that uses correlated information combinations to improve recommendation accuracy. Upon receiving data from a client indicating a visited information type, the method obtains correlated information types related to the visited information type from stored records. The correlated information types providing one or more correlated information combinations each including at least two correlated information types. For each of the one or more correlated information combinations, the method computes a degree of correlation between the correlated information combination and the visited information type. The method then selects a target correlated information combination which has a satisfactory degree of correlation, and recommends the target correlated information combination to the client. The degree of correlation between the correlated information combination and the visited information type may be computed based on an occurrence property of the correlated information combination.

The visited information type may include one or more of merchandise information, blog information, group information, post information, product information, news information, message information, keyword information, and advertisement information.

In one embodiment, to obtain the correlated information types related to the visited information type, the method obtains from the stored records one or more other clients which have used the visited information type, and obtains from the stored records one or more other information types which have been used by the other clients.

In one embodiment, the method obtains user information of the current client and user information of one or more other clients which have used the visited information type, and obtains from the stored records one or more other information types which have been used by the other clients. To compute the degree of correlation between a correlated information combination and the visited information type, the method further determines a weight coefficient for the correlated information combination according to the user information of the current client and the user information of the other clients which have used the visited information type, and computes the degree of correlation between the correlated information combination and the visited information type based on an occurrence property of the correlated information combination and the weight coefficient.

Another aspect of the present disclosure is an apparatus implementing the disclosed method. The apparatus may have a server computer or be part of a server computer. The disclosed method and apparatus facilitate interactions among various information flows and customized recommendations, and may improve the accuracy of a recommendation system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

According to one embodiment of the present disclosure, the method for information recommendation obtains visited information type of a client, obtains a plurality of correlated information types related to the visited information type from stored records, and obtains an occurrence property of one or more correlated information combinations of at least two correlated information types. The method then computes, for each of at least some of the correlated information combinations, a degree of correlation between the correlated information combination and the visited information type, selects from the one or more of the correlated information combinations a target correlated information combination whose degree of correlation satisfies a requirement, and recommends the target correlated information combinations to the client. Multiple target correlated information combinations may be selected and recommended.

Figure 1:
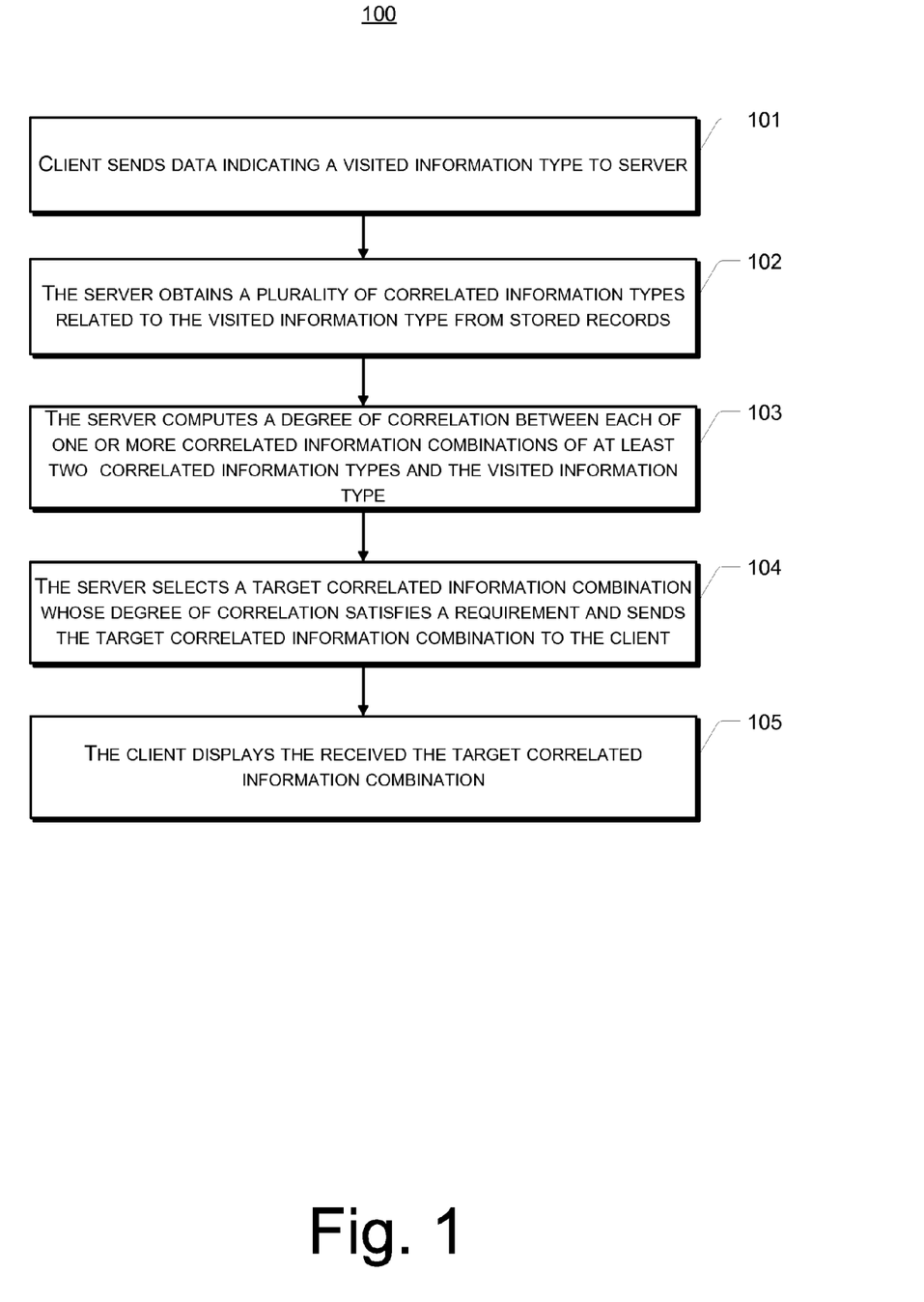
FIG. 1 shows a flow chart of an exemplary method for information recommendation in accordance with the present disclosure.

FIG. 1 shows a flow chart of an exemplary method 100 for information recommendation in accordance with the present disclosure. In this description, the order in which a process is described is not intended to be construed as a limitation, and any number of the described process blocks may be combined in any order to implement the method 100, or an alternate method. The exemplary method 100 illustrated in FIG. 1 is described as follows.

At Block 101, a client sends data indicating a visited information type to a server. For example, the client sends merchandise information or blog information to the server to indicate which merchandise or blog has been visited or used by a current user. In the exemplary embodiments of the present disclosure, visited information type may include, but are not limited to, one or more of Internet information entity such as merchandise information, blog information, group information, post information, product information, news information, message information, keyword information, and advertisement information.

At this block, the client may further send user information of the current user at the client to the server. For instance, a registration name of the client's user may be sent to the server. The server may obtain such user information as education level, career information, and age information of the user based on the registration name of the client's user, and prepares a second mining according to the user information of the client.

At Block 102, the server obtains a plurality of correlated information types related to the visited information type from stored records. For example, the server first obtains records of one or more other clients which have used or visited the current visited information type. Examples of using or visiting a certain information type include, but are not limited to, such acts of as browsing, saving, buying, commenting, processing, joining, and recommending the information type. The server then obtains from the stored records the other information types that have also been used or visited by these clients. Examples of these various information types may include any one or more of merchandise information, blog information, group information, post information, product information, news information, message information, keyword information, and advertisement information. The server has thus learned about various other information types that have been used by the one or more other clients who have also used the same current visited information type. These various other information types are considered to be correlated or related to the current visited information type. The server therefore obtains a variety of correlated information types related to the current visited information type this way. These correlated information types provide one or more correlated information combinations each including at least two correlated information types. The correlated information combinations are then used in a manner as described below.

At Block 103, the server obtains an occurrence property of each correlated information combination of at least two correlated information types, and computes for the correlated information combination a degree of correlation between the correlated information combination and the visited information type. This may be done either for every correlated information combination provided by the correlated information types, or for just a selected number of correlated information combinations. The occurrence property of a correlated information combination may include one or more of a frequency of occurrence, a time of occurrence, and a place (e.g., a platform) of occurrence.

Here, the server may first select correlated information combinations according to an application scenario of the client at Block 102. For example, according to the application scenario of the client, the server may select correlated information combinations which have two or more correlated information types such as merchandise information, blog information, group information, post information, product information, news information, message information, keyword information, and advertisement information. The application scenario may indicate that certain information types are undesired or unnecessary, while certain other information types are desired or necessary. The correlated information combinations of the desired or necessary information types are then selected. For example, either a correlated information combination of the merchandise information and news information, or a correlated information combination of the blog information, group information and post information may be selected, depending on the application scenario. The occurrence properties of each correlated information combination are then surveyed (e.g., counted using any suitable statistical method), and are used for computing the degree of correlation between a respective correlated information combination and the visited information type.

A single occurrence property such as the frequency of occurrence for each correlated information types may first be obtained to obtain a frequency of occurrence for each correlated information combination. The degree of correlation between each correlated information combination and the visited information type may then be computed based on the respective frequency of occurrence for the correlated information combination. Alternatively, multiple occurrence properties such as the frequency and the time of occurrence for each correlated information type may first be obtained to obtain the frequency of occurrence and the time of occurrence of each correlated information combination. The degree of correlation between each correlated information combination and the visited information type may then be computed based on the respective frequency and time of occurrence of the correlated information combination.

Here, a second mining may be performed using the user information of the client obtained at Block 101. From the correlated information types obtained at Block 102, the server may obtain occurrence properties of correlated information combinations of at least two correlated information types that satisfy the requirements of the application scenario of the client. For example, the server may obtain an occurrence property of each correlated information combination that has blog information, group information and post information according to certain application scenario.

Upon obtaining the user information of the current client and the user information of other clients which have used the same visited information type, the server may determine weight coefficients for the occurrence property of each correlated information combination based on the information of the client and the information of the client(s) having used the visited information type. Finally, the server computes a degree of correlation between each correlated information combination and the visited information type based on the occurrence property of the respective correlated information combination and the corresponding weight coefficient.

At Block 104, the server selects a target correlated information combination which has a satisfactory degree of correlation from the correlated information combinations and sends the target associated information combination to the client. One or more correlated information combinations may be selected and sent in this manner.

Here, the degrees of correlation which have been computed at Block 103 can be ranked for the purpose of selection. Based on a ranking result, one or more correlated information combinations having a degree of correlation with a higher rank are selected and recommended to the client. Alternatively, the degrees of correlation which are computed at Block 103 may be compared with a set value. If a degree of correlation is greater than the set value, the respective correlated information combination is selected and recommended to the client.

At this block, the selected target correlated information combination may be sent to the client after having been converted to a corresponding hypertext format needed according to the application scenario of the client. For example, the server may send to the client one or more of the correlated information combinations and their corresponding hypertext format.

At Block 105, the client displays the received correlated information combination. For example, one or more of the correlated information combinations recommended at Block 104 and their corresponding hypertext formats are displayed to the user.

Figure 2:
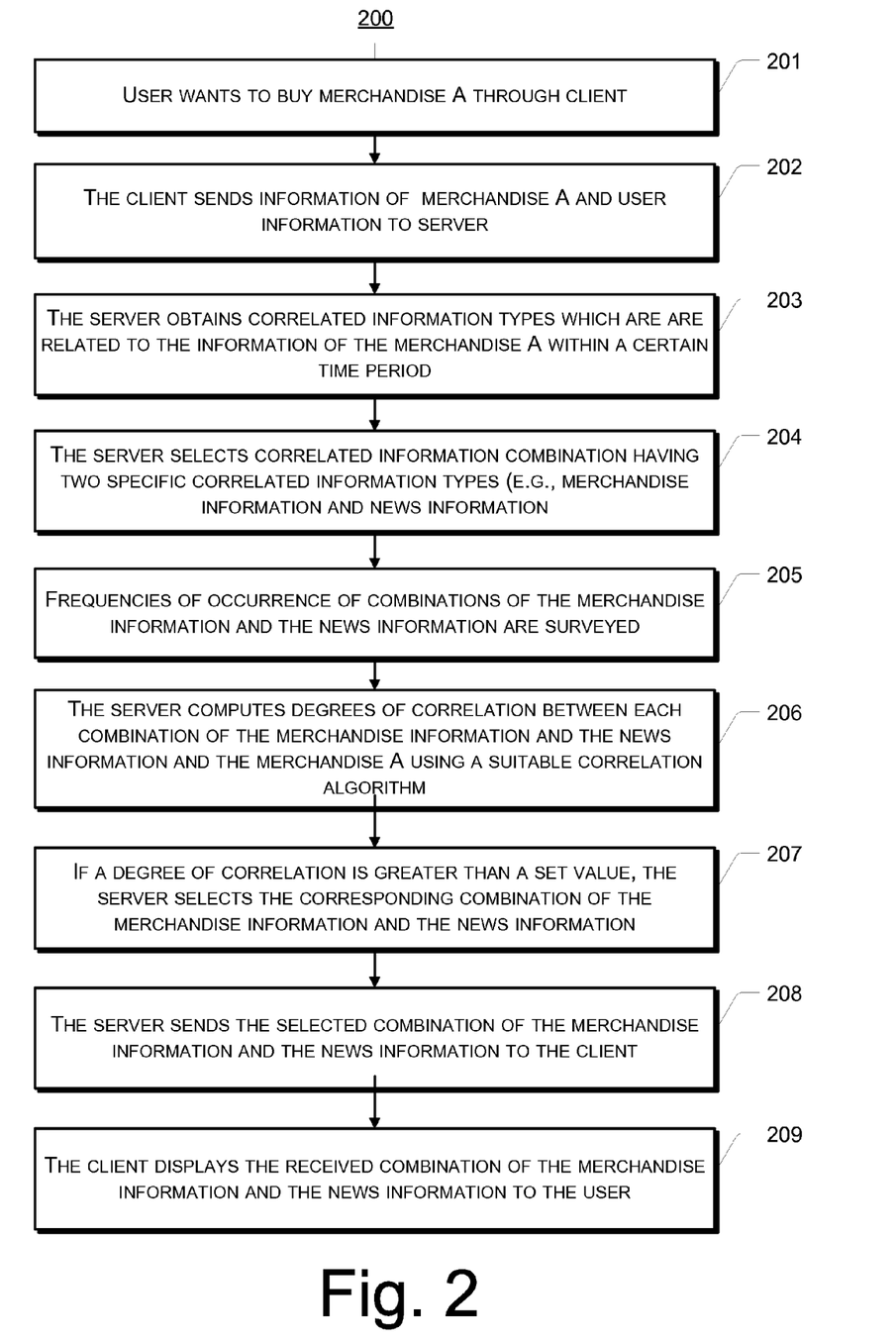
FIG. 2 shows a flow chart of the method for information recommendation in an exemplary application environment.

FIG. 2 shows a flow chart of the method 200 for information recommendation in an exemplary application environment. In FIG. 2, merchandise information is used as an example of the visited information type. However, it should not be construed that the method 200 of the present disclosure can only be used for recommending merchandise information. Recommendation for any Internet information entity such as blog information, group information, post information, product information, news information, message information, keyword information, and advertisement information can also be implemented in similar manners to the exemplary embodiments of the present disclosure. The exemplary method 200 of FIG. 2 is described as follows.

At Block 201, a user accesses a web page having merchandise information through a client. For example, the user may desire to buy merchandise A by accessing the webpage.

At Block 202, the client used by the user sends information of the merchandise A and user information to a server. For the purpose of using the disclosed method, the information of the merchandise A may only need to indicate that the user is interested in buying the merchandise A or has visited merchandise A, and no full description of the merchandise A may be necessary.

At Block 203, upon receiving the information of the merchandise A and the user information, the server obtains from stored records information of other users who are related to the information of the merchandise A within a certain period of time. For example, the server may obtain other users who have bought, browsed, or collected the merchandise A within the last month. For the purpose of illustration, assume that such uses include user M1, user M2, user M3, user M4, and user M5. The server further obtains various other information types that have been used by M1, M2, M3, M4, and M5. For example, in addition to buying merchandise A, user M1 may have also bought merchandise B, merchandise C, and merchandise D, browsed blog1, blog2, blog3, advertisement1, advertisement2, advertisement3, and advertisement4, and joined group1 and group2. User M2 may have also bought merchandise B, merchandise C, and merchandise E, browsed blog1, blog2, blog4, advertisement1, advertisement2, and advertisement3, and posted post1 and post2. User M3 may have also browsed merchandise B, merchandise D, merchandise F, blog1, blog4, and blog5, joined group1, and posted post1 and post3. User M4 may have also collected merchandise B, merchandise F, and merchandise G, browsed blog2, news1, news2, and news3, joined group2, and posted post3 and post4. User M5 may have also bought merchandise B and merchandise F, browsed blog2, blog6, and advertisement4, joined group1 and group3, and browsed news1 and news4. These various additional information types are considered correlated information types of the information of merchandise A, that is, information types that are correlated to the information of merchandise A. At this block, the server may further obtain one or multiple kinds of user information such as age information, education level, career information, and family information of the users M1, M2, M3, M4, and M5.

At Block 204, according to an application platform of the web page that the user visits, correlated information combinations satisfying the application platform are selected from the combinations of at least two information types obtained. If the accessed web page contains only a combination of merchandise information and news information, for example, the combination of the merchandise information and the news information is selected to be correlated information combination. If the accessed web page contains a combination of merchandise information, blog information, advertisement information, and news information, the combination of the merchandise information, the blog information, the advertisement information, and the news information is then selected to be correlated information combination. That is, based on an application environment of the web page that the user visits, the method selects correlated information combinations which satisfy the application environment. The selected correlated information combination each has at least two information types which are compatible to the application environment. The current example uses an accessed web page having merchandise information and news information for illustration. Therefore, the combination of merchandise information and news information is selected to be a correlated information combination. Because there are multiple kinds of merchandises and news, the selected correlated information combination may represent multiple combinations of specific merchandises and news.

At Block 205, occurrence properties of the various combinations of the merchandise information and the news information are surveyed. The current example uses the frequency of occurrence as an example of occurrence property for illustration.

In an illustrative example, among the users who have bought, browsed, or collected the merchandise A, two users have bought, browsed or collected the merchandise B, and browsed news1. Accordingly, the frequency of occurrence of the combination of the merchandise B and news1 is two. Two users have bought, browsed or collected the merchandise F and browsed news1. Accordingly, the frequency of occurrence of the combination of merchandise F and news1 is two. One user has bought, browsed or collected the merchandise B, and browsed news2. Accordingly, the frequency of occurrence of the combination of the merchandise B and news2 is one. One user has bought, browsed or collected the merchandise B, and browsed news3. Accordingly, the frequency of occurrence for the merchandise B and news3 is one. One user has bought, browsed or collected the merchandise B, and browsed news4. Accordingly, the frequency of occurrence of the combination of the merchandise B and news4 is one. One user has bought, browsed or collected the merchandise F, and browsed news2. Accordingly, the frequency of occurrence of the combination of the merchandise F and news2 is one. One user has bought, browsed or collected the merchandise E, and browsed news3. Accordingly, the frequency of occurrence of the combination of the merchandise F and news3 is one. One user has bought, browsed or collected the merchandise F, and browsed news4. Accordingly, the frequency of occurrence of the combination of the merchandise F and news4 is one. One user has bought, browsed or collected the merchandise G, and browsed news1. Accordingly, the frequency of occurrence for the merchandise G and news1 is one. One user has bought, browsed or collected the merchandise G, and browsed news2. Accordingly, the frequency of occurrence of the combination of the merchandise G and news2 is one. One user has bought, browsed or collected the merchandise G, and browsed news3. Accordingly, the frequency of occurrence of the combination of the merchandise G and news3 is one.

At Block 206, based on the statistics results obtained at Block 205, the server computes a degree of correlation between each combination of merchandise/news information and the visited information type (which in the present example is buying the merchandise A) using a suitable correlation algorithm. The computed degrees of correlation indicate the degree of correlation between each combination merchandise/news information and buying of the merchandise A. For example, a recommendation algorithm using collaborative filtering may be used to compute the degrees of correlation. Alternatively, a recommendation algorithm having pre-configured business rule(s) may be used.

From the statistical results, it can be seen that the combination of the merchandise B and news1, and the combination of the merchandise F and news1 co-occur with the merchandise A most frequently, each having co-occurrence frequency of two. The degrees of correlation between these combinations and the merchandise A may be determined to be two, based on the respective frequency of occurrence. Similarly, the degree of correlation between the combination of the merchandise B and news2 and the merchandise A is one. The degree of correlation between the combination of the merchandise B and news3 and the merchandise A is one. The degree of correlation between the combination of the merchandise B and news4 and the merchandise A is one. The degree of correlation between the combination of the merchandise F and news2 and the merchandise A is one. The degree of correlation between the combination of the merchandise F and news3 and the merchandise A is one. The degree of correlation between the combination of the merchandise F and news4 and the merchandise A is one.

In some embodiments, the method may perform a second mining based on the user information which has been sent from the client. For example, further mining may be performed on the above computed degrees of correlation using the education levels of the users. For example, upon surveying education levels of the users who have browsed or collected the merchandise A, it may be observed that highly educated users have a higher interest in the merchandise B and news1. If the user information returned from the current client shows that the associated user is also highly educated, a higher weight coefficient may be signed to the frequency of occurrence of the combination of the merchandise B and news1. For instance, the weight coefficient for the frequency of occurrence of the combination of the merchandise B and news1 may be set to be one, while the weight coefficient for the frequency of occurrence of the merchandise F and news1 may be set to a relatively lower 0.6. As such, a result obtained after further mining the user information may show that the degree of correlation between the combination of merchandise B and news1 and the present visited merchandise A is the highest at a value of 2, while the degree of correlation between the combination of merchandise F and news1 and the merchandise A is the second highest at a value of 1.2 (2×0.6=1.2). The weight coefficients for the other combinations of the merchandise information and the news information may be assigned in a similar manner. The degree of correlation between various combinations of the merchandise information and the news information and the merchandise A are obtained based on the respective frequencies of occurrence and weight coefficients.

At Block 207, the degrees of correlation which have been computed at Block 206 are compared with a set value. If a degree of correlation is greater than the set value, the combination corresponding to this degree of correlation is selected. In the illustrated example, the set value for the degree of correlation is one. Accordingly, the combinations having degree of correlation greater than the set value include the combination of the merchandise B and news1 and the combination of the merchandise F and news1.

In one embodiment, the degrees of correlation between the correlated information combinations and the visited information type may be ranked according to their values in order to select correlated information combinations corresponding to a certain number of degrees of correlation according to the ranking. For example, the correlated information combinations with the two highest degrees of correlation in the ranking may be selected.

At Block 208, the server sends one or more of the correlated information combinations selected at Block 207 to the client. The server converts the combination of the merchandise B and news1 and the combination of the merchandise F and news1 into their respective hypertext format. The server then sends the combination of the merchandise B and news1, the combination of the merchandise F and news1, and the respective hypertext formats to the client.

Alternatively, the server may send the correlated information combinations corresponding to a certain number (N) of degrees of correlation, and the respective hypertext formats to the client.

At Block 209, the client displays the combination of the merchandise B and news1 and the combination of the merchandise F and news1 with their respective requested hypertext formats to the user. Alternatively, the client may display the correlated information combinations corresponding to a certain number of degrees of correlation with the respective requested hypertext formats to the user.

An apparatus for information recommendation is further provided to implement the disclosed method. The above-described techniques may be implemented with the help of one or more computer-readable media containing computer-executable instructions. The computer computer-executable instructions enable a computer processor to perform a competitive resource allocation in accordance with the techniques described herein. It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

Figure 3:
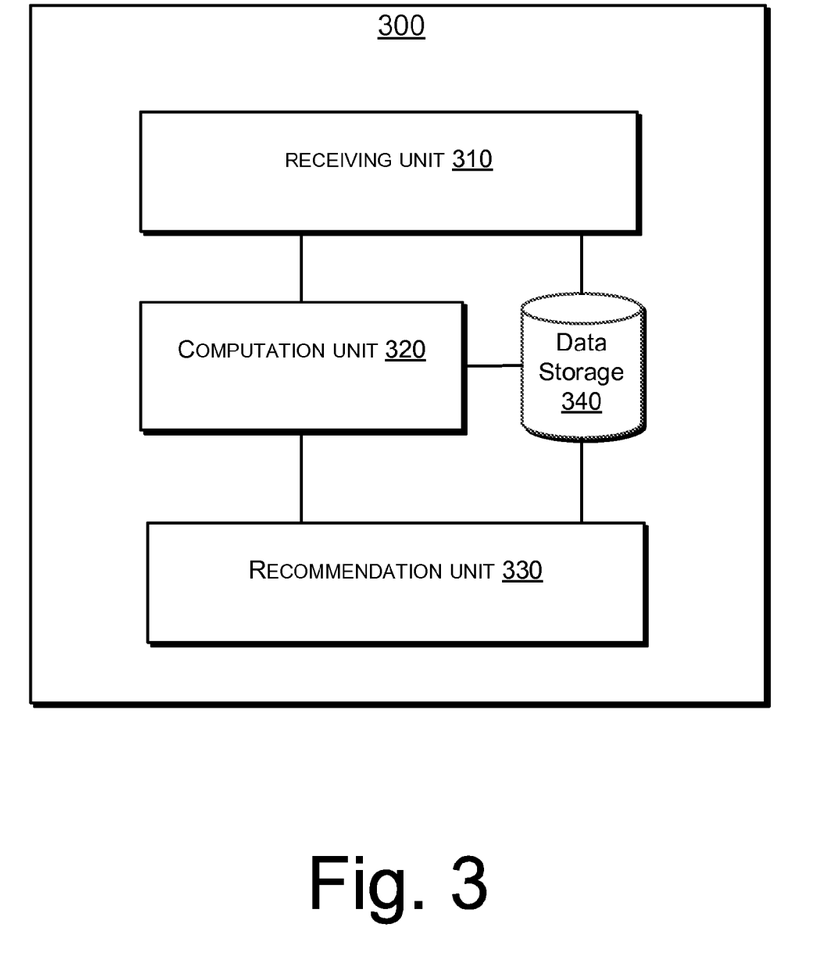
FIG. 3 shows a structural diagram of an apparatus for information recommendation in accordance with the present disclosure.

FIG. 3 shows a structural diagram of an apparatus 300 for information recommendation in accordance with the present disclosure. As illustrated, the apparatus 300 includes a receiving unit 310, a computation unit 320, and a recommendation unit 330.

The receiving unit 310 is used for obtaining from stored records correlated information types related to a visited information type indicated by a client. The correlated information types provide one or more correlated information combinations each including at least two correlated information types.

The computation unit 320 is used for obtaining an occurrence property of each of the one or more correlated information combinations, and computing a degree of correlation between the correlated information combination and the visited information type.

The recommendation unit 330 is used for selecting from the one or more correlated information combinations a target correlated information combination whose degree of correlation satisfies a requirement, and recommending the target correlated information combination to the client.

The apparatus 300 may further include a storage unit 340 used for storing the stored records containing information that have been used by the current client and one or more other clients.

In one embodiment, the computation unit 320 is further used for selecting the one or more correlated information combinations each having at least two kinds of correlated information types from the a plurality of correlated information types based on an application scenario of the client. The computation unit 320 may also be adapted for determining the occurrence properties of each correlated information combination.

The receiving unit 310 may be further adapted for obtaining user information of the current client and user information of one or more other clients which have used the visited information type, and for obtaining one or more other information types which have been used by the other clients from the stored records stored in the data storage 340. In this embodiment, the computation unit 320 may be further used for determining a weight coefficient for each of the one or more correlated information combinations according to the user information of the current client and the user information of the one or more other clients which have used the visited information type. The computation unit 320 may further compute the degree of correlation between each correlated information combination and the visited information type based on an occurrence property of the respective correlated information combination and the weight coefficient.

In one embodiment, the recommendation unit 330 is further used for ranking the correlated information combinations according to their degrees of correlation with the visited information type, and further selecting a target correlated information combinations according to the ranking of the degrees of correlation. Alternatively or additionally, the recommendation unit 330 may be used for comparing the degrees of correlation with a set value, and selecting from the correlated information combinations a target correlated information combination whose degree of correlation is greater than the set value.

The apparatus 300 may be further adapted for converting a correlated information combination into a hypertext format, and sending the hypertext format to the client.

Herein, a "unit" is a device which is a tool or machine designed to perform a particular task or function. A unit or device can be a piece of hardware, software, a plan or scheme, or a combination thereof, for effectuating a purpose associated with the particular task or function. In addition, delineation of separate units does not necessarily suggest that physically separate devices are used. Instead, the delineation may be only functional, and the functions of several units may be performed by a single combined device or component. When used in a computer-based system, regular computer components such as a processor, a storage and memory may be programmed to function as one or more units or devices to perform the various respective functions.

The apparatus 300 may be a backend server or implemented in such a server. Upon obtaining visited information type of a client, the server obtains a plurality of correlated information types related to the visited information type from stored records, and an occurrence property of each correlated information combination of least two correlated information types. The server then computes for each correlated information combination a degree of correlation between the correlated information combination and the visited information type, selects one or more of the correlated information combinations whose degree of correlation satisfies a requirement, and recommends the selected correlated information combinations to the client. The server may further perform a second mining for user information of the client, and hence can recommend the most suitable information to the user. Based on any input of the user, the server outputs different recommendation results correlated to the input. The input may be information of a group of people, a discussion or chat group, merchandise, a blog, a post, a description of a product, a message or news. The output may be any combination of information of a group of people, a discussion or chat group, merchandise, a blog, a post, a description of a product, a message or news. The method is applicable to a variety of Internet information entities to accomplish interactions among various information flows, customize recommendations, and improve the recommendation accuracy and coverage of recommended information. Proper use of the method may improve the sale volume and browsing volume of a website.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for information recommendation, the method comprising:
  receiving data from a client indicating a visited information type;
  obtaining a plurality of correlated information types related to the visited information type from stored records, the plurality of correlated information types providing one or more correlated information combinations each including at least two correlated information types;
  for each of the one or more correlated information combinations, computing a degree of correlation between the correlated information combination and the visited information type, the computing comprising:
    selecting the one or more correlated information combinations based on an application scenario of the client;
    determining an occurrence property of each of the one or more correlated information combinations; and
    computing the degree of correlation between each of the one or more correlated information combinations and the visited information type using the occurrence property; and
  selecting from the one or more correlated information combinations a target correlated information combination whose degree of correlation satisfies a requirement, and recommending the target correlated information combination to the client.

2. The method as recited in claim 1, wherein the occurrence property comprises one or more of a frequency of occurrence, a time of occurrence, or a platform of occurrence.

3. The method as recited in claim 1, wherein the visited information type includes one or more of merchandise information, blog information, group information, post information, product information, news information, message information, keyword information, or advertisement information.

4. The method as recited in claim 1, wherein obtaining the plurality of correlated information types related to the visited information type comprises:
   obtaining from the stored records one or more other clients which have used the visited information type; and
   obtaining one or more other information types which have been used by the one or more other clients from the stored records.

5. The method as recited in claim 1, further comprising:
   obtaining user information of the client and user information of one or more other clients which have used the visited information type; and
   wherein computing the degree of correlation between each of the one or more correlated information combinations and the visited information type further comprises:
   determining a weight coefficient for each of the one or more correlated information combinations according to the user information of the client and the user information of the one or more other clients which have used the visited information type; and
   computing the degree of correlation between the correlated information combination and the visited information type based on the occurrence property of each of the one or more correlated information combinations and the weight coefficient.

6. The method as recited in claim 5, wherein the user information of the client and the user information of the one or more other clients each include one or more of user age information, user education level, user career information, and user family information.

7. The method as recited in claim 1, wherein selecting from the one or more correlated information combinations a target correlated information combination comprises:
   ranking the one or more correlated information combinations according to the respective degree of correlation, and selecting a correlated information combination whose degree of correlation is ranked among the highest to be the target correlated information combination.

8. The method as recited in claim 1, wherein selecting from the one or more correlated information combinations a target correlated information combination comprises:
   comparing the degree of correlation of each of the one or more correlated information combinations with a set value, and selecting a correlated information combination whose degree of correlation is greater than the set value to be the target correlated information combination.

9. The method as recited in claim 1, further comprising:
   converting the target correlated information combination into a hypertext format; and
   sending the hypertext format to the client.

10. An apparatus for information recommendation, the apparatus comprising:
    one or more processors;
    memory;
    a receiving unit stored in the memory and executable by the one or more processors that is configured to:
    obtain from stored records a plurality of correlated information types related to a visited information type indicated by a client, the plurality of correlated information types providing one or more correlated information combinations each including at least two correlated information types, and
    obtain user information of the client and user information of one or more other clients which have used the visited information type and obtaining one or more other information types which have been used by the one or more other clients from the stored records;
    a computation unit stored in the memory and executable by the one or more processors that is configured to:
    obtain an occurrence property of each of the one or more correlated information combinations,
    select the one or more correlated information combinations of at least two correlated information types based on an application scenario of the client,
    determine a weight coefficient for each of the one or more correlated information combinations according to the user information of the client and the user information of the one or more other clients which have used the visited information type, and
    compute a degree of correlation between each of the one or more correlated information combinations and the visited information type based on an occurrence property of the respective correlated information combination and the weight coefficient; and
    a recommendation unit stored in the memory and executable by the one or more processors that is configured to select from the one or more correlated information combinations a target correlated information combination whose degree of correlation satisfies a requirement, and recommend the target correlated information combination to the client.

11. The apparatus as recited in claim 10, wherein the apparatus further comprises:
    a storage unit configured to store the stored records containing information that have been used by the client and one or more other clients.

12. The apparatus as recited in claim 10, wherein the apparatus comprises a server computer.

13. A method comprising:
    under control of one or more processors configured with executable instructions:
    receiving, from a client, data indicating a visited information type, the visited information type comprising a type of information that is visited or used by a user of the client;
    obtaining records of one or more other clients that have visited or used the visited information type;
    obtaining a plurality of correlated information types that have been visited or used by the one or more other clients;
    selecting a plurality of combinations of correlated information from the plurality of correlated information based on an application scenario of the client, the application scenario indicating which information type of the plurality of correlated information is undesirable to the user and which information type of the plurality of correlated information is desirable to the user;
    computing a degree of correlation between each combination of correlated information and the visited information type;

selecting, from the plurality of combinations of correlated information, one or more target combinations of correlated information having a degree of correlation that satisfies a requirement; and recommending the one or more target combinations of correlated information to the user through the client.

14. The method as recited in claim 13, wherein the plurality of correlated information types comprises at least two of: merchandise information, blog information, group information, post information, product information, news information, message information, keyword information and advertisement information.

15. The method as recited in claim 13, further comprising obtaining an occurrence property of each combination of correlated information, and wherein computing the degree of correlation comprises computing the degree of correlation between each combination of correlated information and the visited information type based on the occurrence property of respective combination of correlated information.

16. The method as recited in claim 15, wherein the occurrence property of each combination of correlated information comprises a frequency of occurrence, a time of occurrence and a place of occurrence of the respective combination of correlated information.

* * * * *